June 19, 1956      V. R. PARKS      2,750,995

SHOCK ABSORBING SEAT BACK

Filed April 15, 1954

INVENTOR.

Vergil R. Parks

BY Victor J. Evans & Co.

ATTORNEYS

United States Patent Office 2,750,995
Patented June 19, 1956

2,750,995

SHOCK ABSORBING SEAT BACK

Vergil R. Parks, Sierra Madre, Calif.

Application April 15, 1954, Serial No. 423,327

2 Claims. (Cl. 155—164)

This invention relates to seats particularly of the type used in buses and where the seats are provided with reclining backs for use in traveling overnight or in traveling comparatively long distances, and in particular a seat back in which a forward portion is connected to a rear portion with links with the links retained in positions perpendicular to the rear portion of the back with neutralizing springs and with the forward portion of the back positioned to rest upon resilient elements or springs supported by the rear portion.

The purpose of this invention is to provide means in a seat back to compensate for continuous up and down movement of the back of an occupant of a seat, the said up and down action resulting from the occupant of the the seat being positioned in springs whereas the back of the seat is rigidly connected to the base.

A person riding in a bus seat is resiliently supported by springs in the seat whereby the person moves upwardly and downwardly continuously in travel and with the back rigidly connected to the seat the back of the person rubs continuously against the face of the seat back which not only wears the clothing of the person riding in the seat but is also very tiresome particularly in traveling long distances. With this thought in mind this invention contemplates means for mounting the forward or front portion of the back of a seat on the supporting portion thereof whereby the forward portion is suspended for providing a floating action so that the forward portion of the back of the seat may travel with the seat portion thereof.

The object of this invention is, therefore, to provide means for mounting the forward portion of the back of a seat against the supporting portion whereby the forward portion is free to swing upwardly and downwardly with movements of the seat.

Another object of the invention is to provide resilient means in a connection between the front portion of a seat back and a supporting portion whereby the front portion is free to travel longitudinally of the supporting portion and wherein the front portion is returned to a neutral position when forces acting thereagainst are relieved.

A further object of the invention is to provide a seat back having a floating forward section carried by a rigid rear section in which the back is of a simple and economical construction.

With these and other objects and advantages in view the invention embodies a seat back having posts pivotally mounted to the base of the seat with a frame having a cushion on the outer surface pivotally connected by links at the ends thereof to the posts of the back with spaced links, with the links resiliently urged to positions perpendicular to the posts with connecting springs and with the frame resiliently urged upwardly with springs positioned between the lower edge thereof and a support carried by the posts of the supporting portion of the back.

Other features and advantages of the invention will appear from the following description taken in connection with the drawing, wherein.

Figure 1:
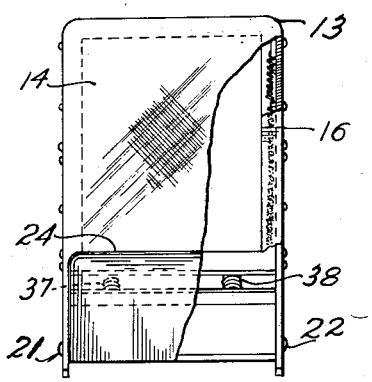
Figure 1 is a view showing a front elevation of a seat such as the seat of a bus or the like, with parts broken away showing floating supporting elements at one end of the seat.
Figure 2:
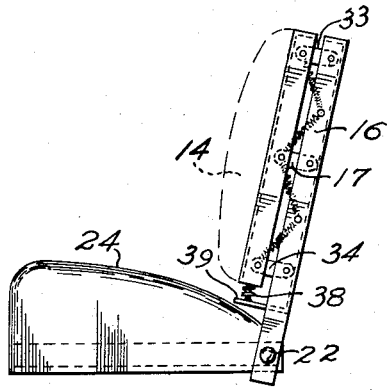
Figure 2 is an end elevational view of the seat shown in Fig. 1 with a cushion on a floating frame providing the face of the back of the seat shown in broken lines.
Figure 3:
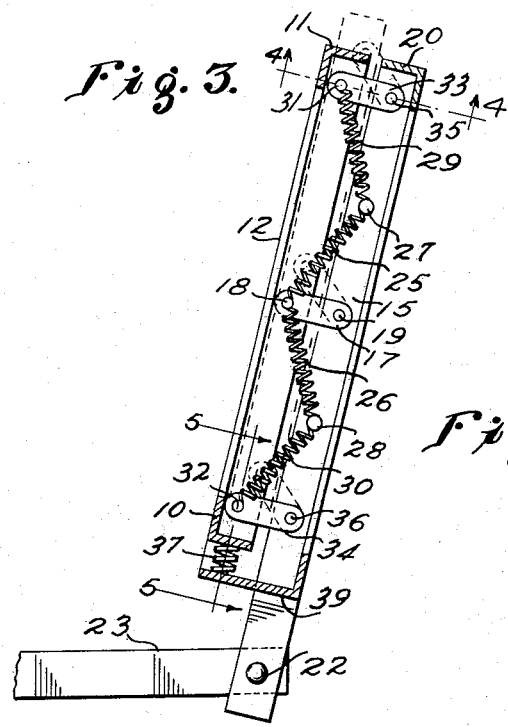
Figure 3 is a vertical cross section through one end of the back of the seat illustrating the position of the connecting links and resilient elements or springs.
Figure 4:
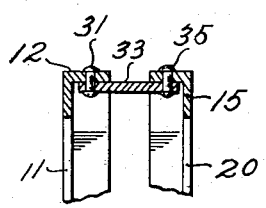
Figure 4 is a detail showing a section taken on line 4—4 of Fig. 3 showing the mounting of one of the connecting links, the parts being shown on an enlarged scale.
Figure 5:
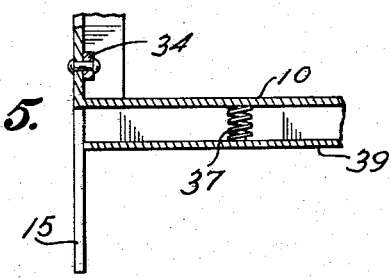
Figure 5 is a detail showing a section taken on line 5—5 of Fig. 3 illustrating the resilient supporting elements of a floating frame on which the cushion of the seat back is positioned.

Referring now to the drawing wherein like reference characters denote corresponding parts the shock absorbing seat back of this invention includes a frame having a horizontally disposed lower bar 10, a similar upper bar 11, and end bars 12 and 13, and this frame is provided with a cushion as indicated by the broken lines 14.

This frame is pivotally connected to vertically disposed posts 15 and 16 with links 17, the outer ends of which are connected with rivets 18 to end members 12 and 13 of the floating frame upon which the cushion 14 is mounted, the opposite ends of the links being connected by rivets or pins 19 to the posts 15 and 16. The upper ends of the posts 15 and 16 are connected with an upper rail 20 and the lower ends are pivotally connected with pins or bolts 21 and 22 to a frame 23 of a seat 24. The links 17 which are positioned substantially midway between the upper and lower ends of the seat back are urged to neutral positions, perpendicular to the posts with springs 25 and 26 which extend from the pins or rivets 18 to pins 27 and 28, respectively, and the upper and lower links are similarly held with springs 29 and 30 one of the ends of which are secured to the pins 27 and 28 and the opposite ends to pins 31 and 32 by which the upper and lower links are pivotally attached, respectively, to the end members of the floating frame. The opposite ends of the upper and lower links which are indicated by the numerals 33 and 34 are secured to the posts 15 and 16 with pins 35 and 36, respectively.

The floating frame is urged upwardly by resilient elements, such as the springs 37 and 38 which are positioned between the lower frame member 10 and a support 39 extended between the posts 15 and 16.

With the parts designed and assembled in this manner the vertically reciprocating movement of the back of a person positioned on the seat 24 causes the floating section of the back of the seat to travel with the back of the person whereby comfort of the person is materially enhanced. With the floating section carried on the posts of the back the angle or position of the back may readily be adjusted to provide an upright or reclining seat whereby persons riding in buses having seats of this type may travel with greater comfort.

It will be understood that modifications, within the scope of the appended claims, may be made in the design and arrangement of the parts without departing from the spirit of the invention.

What is claimed is:

1. A seat back comprising posts connected by a member at the upper ends thereof providing a U-shaped frame, means adapted to pivotally connect the posts to a seat frame, a floating frame positioned parallel to and spaced from the U-shaped frame, links positioned at both ends of the back of the seat pivotally connecting the floating frame to the posts, resilient elements connected to said links and to the back of the seat intermediate of said links for urging the links to neutral positions with said links perpendicular to the posts, a support member extended between the lower ends of the posts and carried thereby, and springs positioned between said support member and the lower end of the floating frame.

2. In a seat back, the combination which comprises substantially vertically disposed posts the upper ends of which are connected with a cross member, the lower ends of said posts being adapted to be pivotally connected to a seat frame, a support member extended between and carried by said posts, a floating frame having a cushion thereon spaced from said posts and positioned above said support member, springs positioned between the support member and lower portion of the floating frame, parallel links positioned at the ends of the seat with one of the ends of the links pivotally connected to the floating frame and with the opposite ends of the links pivotally connected to said posts, and diagonally positioned springs connected to ends of the links connected to the floating frame and also connected to said posts intermediate of the pivotal connection of the links to said posts, said springs being positioned to urge the links to neutral positions wherein the links are perpendicular to the posts.

References Cited in the file of this patent

UNITED STATES PATENTS

| | | |
|---|---|---|
| 1,732,116 | Boller | Oct. 15, 1929 |
| 1,775,433 | Krabol | Sept. 9, 1930 |
| 1,896,477 | Boller | Feb. 7, 1933 |
| 2,419,884 | Caughey | Apr. 29, 1947 |
| 2,513,440 | Alderson | July 4, 1950 |
| 2,606,727 | De Haven | Aug. 12, 1952 |

FOREIGN PATENTS

| | | |
|---|---|---|
| 17,868 | France | Oct. 3, 1913 |
| 484,642 | Great Britain | May 9, 1938 |